US008472924B2

(12) United States Patent
Watson et al.

(10) Patent No.: US 8,472,924 B2
(45) Date of Patent: Jun. 25, 2013

(54) SYSTEM AND METHOD FOR PROVIDING CONCIERGE SERVICES TO A MOBILE DEVICE USER

(75) Inventors: Scott Watson, Marina Del Rey, CA (US); Armando Santana, Glendale, CA (US); Robert Scott Trowbridge, La Canada, CA (US); Orrin J. Shively, Glendale, CA (US); Robert Swirsky, Sunnyvale, CA (US); Jonathan Gilbert, San Francisco, CA (US); Ben Brown, Austin, TX (US)

(73) Assignee: Disney Enterprises, Inc., Burbank, CA (US)

( * ) Notice: Subject to any disclaimer, the term of this patent is extended or adjusted under 35 U.S.C. 154(b) by 649 days.

(21) Appl. No.: 12/313,228

(22) Filed: Nov. 17, 2008

(65) Prior Publication Data
US 2009/0233584 A1    Sep. 17, 2009

Related U.S. Application Data

(60) Provisional application No. 61/069,116, filed on Mar. 11, 2008.

(51) Int. Cl.
*H04M 3/42* (2006.01)
*H04M 3/493* (2006.01)
*H04L 29/06* (2006.01)

(52) U.S. Cl.
USPC ............... 455/414.1; 455/414.2; 455/414.3

(58) Field of Classification Search
USPC .......................... 455/414.1–414.3
See application file for complete search history.

(56) References Cited

U.S. PATENT DOCUMENTS

| 6,189,783 | B1 | 2/2001 | Motomiya |
|---|---|---|---|
| 6,671,807 | B1 | 12/2003 | Jaisimha |
| 7,251,495 | B2 | 7/2007 | Keyani |
| 7,409,221 | B2 | 8/2008 | Obradovich |
| 7,412,042 | B2 * | 8/2008 | Henry .................. 379/201.01 |
| 7,505,779 | B1 * | 3/2009 | David ..................... 455/518 |
| 7,509,124 | B2 | 3/2009 | O'Neil |
| 7,801,537 | B2 | 9/2010 | Matsumoto |
| 8,005,460 | B2 | 8/2011 | Chen |
| 8,099,109 | B2 | 1/2012 | Altman |
| 8,332,402 | B2 | 12/2012 | Forstall |
| 2001/0054101 | A1 * | 12/2001 | Wilson ..................... 709/225 |
| 2002/0068573 | A1 * | 6/2002 | Raverdy et al. ............ 455/445 |
| 2002/0069419 | A1 | 6/2002 | Raverdy |
| 2002/0082897 | A1 | 6/2002 | Menelly |
| 2002/0174003 | A1 | 11/2002 | Redmann |

(Continued)

OTHER PUBLICATIONS

"Twitter: What are you doing?" 2008 *Twitter*. Jan. 6, 2009 <http://twitter.com/>.

(Continued)

*Primary Examiner* — Nathan Mitchell
(74) *Attorney, Agent, or Firm* — Farjami & Farjami LLP

(57) ABSTRACT

There is provided a method for providing concierge services to a mobile device user. The method comprises receiving a concierge identification code sent from a mobile device; authenticating activation of concierge services for the concierge identification code; assigning the mobile device to the concierge identification code; sending a confirmation message to the mobile device; receiving a concierge command from the mobile device; obtaining concierge command results from a local services network; sending the concierge command results to the mobile device; and terminating activation of concierge services after an activation period corresponding to the concierge identification code.

24 Claims, 6 Drawing Sheets

U.S. PATENT DOCUMENTS

| | | |
|---|---|---|
| 2002/0174248 A1 | 11/2002 | Morriss |
| 2003/0014749 A1 | 1/2003 | Simons |
| 2003/0055959 A1* | 3/2003 | Sato .............................. 709/224 |
| 2003/0083889 A1* | 5/2003 | Macklin ............................. 705/1 |
| 2003/0172090 A1 | 9/2003 | Asunmaa |
| 2003/0185232 A1* | 10/2003 | Moore et al. .................. 370/465 |
| 2003/0191946 A1 | 10/2003 | Auer |
| 2004/0019513 A1* | 1/2004 | Colalancia et al. ............... 705/9 |
| 2004/0019800 A1 | 1/2004 | Tatebayashi |
| 2004/0022227 A1 | 2/2004 | Lynch |
| 2004/0078341 A1* | 4/2004 | Steichen ........................ 705/64 |
| 2004/0116115 A1* | 6/2004 | Ertel .......................... 455/426.2 |
| 2004/0158482 A1 | 8/2004 | Hale |
| 2004/0172315 A1 | 9/2004 | Hale |
| 2004/0172316 A1 | 9/2004 | Hale |
| 2004/0181424 A1 | 9/2004 | Hale |
| 2004/0184593 A1* | 9/2004 | Elsey et al. .............. 379/218.01 |
| 2004/0214600 A1* | 10/2004 | Schechet et al. ............. 455/557 |
| 2004/0266408 A1* | 12/2004 | Maes ......................... 455/414.1 |
| 2005/0044224 A1 | 2/2005 | Jun |
| 2005/0060173 A1 | 3/2005 | Hale |
| 2005/0144642 A1 | 6/2005 | Ratterman |
| 2005/0154923 A1* | 7/2005 | Lok et al. ...................... 713/202 |
| 2005/0202830 A1 | 9/2005 | Sudit |
| 2005/0240970 A1 | 10/2005 | Schwalb |
| 2005/0262530 A1 | 11/2005 | Ruetschi |
| 2005/0266827 A1 | 12/2005 | Kim |
| 2006/0008256 A1 | 1/2006 | Khedouri |
| 2006/0159109 A1 | 7/2006 | Lamkin |
| 2006/0189337 A1 | 8/2006 | Farrill |
| 2006/0230061 A1 | 10/2006 | Sample |
| 2007/0016584 A1 | 1/2007 | Grell |
| 2007/0032247 A1* | 2/2007 | Shaffer et al. ............. 455/456.1 |
| 2007/0038476 A1* | 2/2007 | Sternlicht ......................... 705/2 |
| 2007/0121534 A1* | 5/2007 | James et al. .................. 370/313 |
| 2007/0136573 A1 | 6/2007 | Steinberg |
| 2007/0157281 A1 | 7/2007 | Ellis |
| 2007/0161402 A1 | 7/2007 | Ng |
| 2007/0180142 A1* | 8/2007 | Small et al. ................... 709/245 |
| 2007/0203763 A1 | 8/2007 | Ackley |
| 2007/0208664 A1 | 9/2007 | Ortega |
| 2007/0288486 A1 | 12/2007 | Sugihara |
| 2008/0014911 A1 | 1/2008 | Medved |
| 2008/0040484 A1* | 2/2008 | Yardley ......................... 709/227 |
| 2008/0045192 A1 | 2/2008 | Zhao |
| 2008/0068573 A1 | 3/2008 | Omura |
| 2008/0189293 A1 | 8/2008 | Strandel |
| 2008/0200148 A1* | 8/2008 | Fink .............................. 455/411 |
| 2008/0201158 A1 | 8/2008 | Johnson |
| 2008/0248781 A1* | 10/2008 | Cedo Perpinya et al. .. 455/412.1 |
| 2008/0270305 A1* | 10/2008 | Andreasson et al. ........... 705/50 |
| 2008/0319935 A1 | 12/2008 | Chandak |
| 2009/0061835 A1 | 3/2009 | Schmidt |
| 2009/0100480 A1 | 4/2009 | McQuaide |
| 2009/0156181 A1 | 6/2009 | Athsani |
| 2009/0163177 A1* | 6/2009 | Bearden et al. ............ 455/412.1 |
| 2009/0204905 A1 | 8/2009 | Toghia |
| 2009/0215463 A1 | 8/2009 | Satake |
| 2009/0215469 A1 | 8/2009 | Fisher |
| 2009/0233543 A1 | 9/2009 | Watson |
| 2009/0233639 A1 | 9/2009 | Watson |
| 2009/0234935 A1 | 9/2009 | Watson |
| 2009/0313479 A1 | 12/2009 | Schroter |
| 2010/0063866 A1 | 3/2010 | Kinoshita |
| 2010/0080163 A1 | 4/2010 | Krishnamoorthi |
| 2010/0093373 A1 | 4/2010 | Olsson |
| 2010/0144328 A1 | 6/2010 | Keating |
| 2010/0150120 A1 | 6/2010 | Schlicht |
| 2011/0082639 A1 | 4/2011 | Jung |

OTHER PUBLICATIONS

"Jaiku | Your Conversation." *2008 Jaika*. Jan. 6, 2009 <http://jaiku.com/>.

Acohido, Byron, *Google's GPhone strategy could keep user costs low*, USATODAY.com., (Oct. 14, 2007).

"3jam SuperTest::Your Free Text Messaging Inbox on the Web." *2009 3jam, Inc.*. Jan. 6, 2009 <http://www.3jam.com/>.

"Your Social Compass." *2009 Loopt, Inc*. Jan. 6, 2009 <http://www.loopt.com/>.

"dodgeball.com :: mobile social software." *2009 Google Inc.* Jan. 6, 2009 <http://www.dodgeball.com>.

"Disney Files Patent for Wireless FastPasses." NETCOT.com, posted Sep. 5, 2007 <http://www.netcot.com/thesite/2007/09/05/disney-files-patent-for-wireless-fastpasses/>.

U.S. Appl. No. 12/313,231 Non-Final OA dated Apr. 1, 2011.

U.S. Appl. No. 12/313,231 Resp. to Non-Final OA (As Filed Jul. 1, 2011).

U.S. Appl. No. 12/313,229 Non-Final OA dated Sep. 22, 2010.

U.S. Appl. No. 12/313,229 Resp. to Non-Final OA (As Filed Dec. 22, 2010).

U.S. Appl. No. 12/313,229 Final OA dated Mar. 14, 2011.

U.S. Appl. No. 12/313,229 RCE and Resp. to Final OA (As Filed on Jun. 13, 2011).

U.S. Appl. No. 12/313,229 Non-Final OA dated Aug. 4, 2011.

U.S. Appl. No. 12/313,227 Non-Final OA dated Mar. 31, 2011.

U.S. Appl. No. 12/313,227 Resp. to Non-Final OA (as Filed Jun. 30, 2011).

U.S. Appl. No. 12/313,231 Non-Final OA dated May 24, 2012.

* cited by examiner

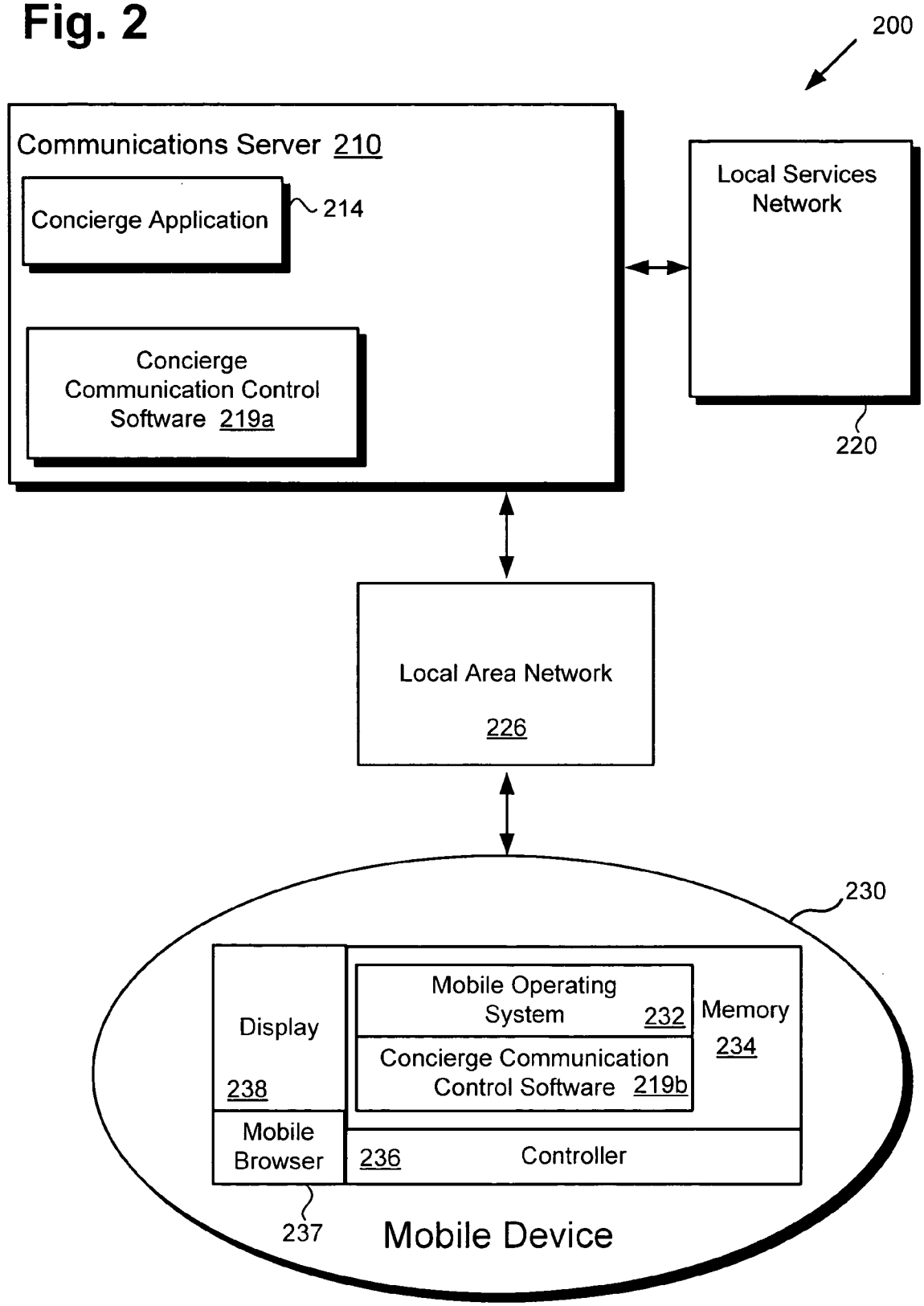

Fig. 4

| Concierge Command | Command Operation |
|---|---|
| !w or !wait | Returns current wait times for park attractions. |
| !a <parkname> or !at <parkname> | Set your park location, where <parkname> can be MK, EPCOT, STUDIO, AK |
| !i or !info | Returns park hours for all parks. |
| !alert <alert trigger> | Returns alert when trigger criteria is met. For example, returns alert when wait times drop below a specified time threshold. |
| !n <your name> or !name <your name> | Set or reset your name. |
| !g or !group | Returns your group identification code, so you can share it with more friends. |
| !q or !quiet | Set to quiet mode, turns off messages. |
| !h or ? or !help | Ask for help. |

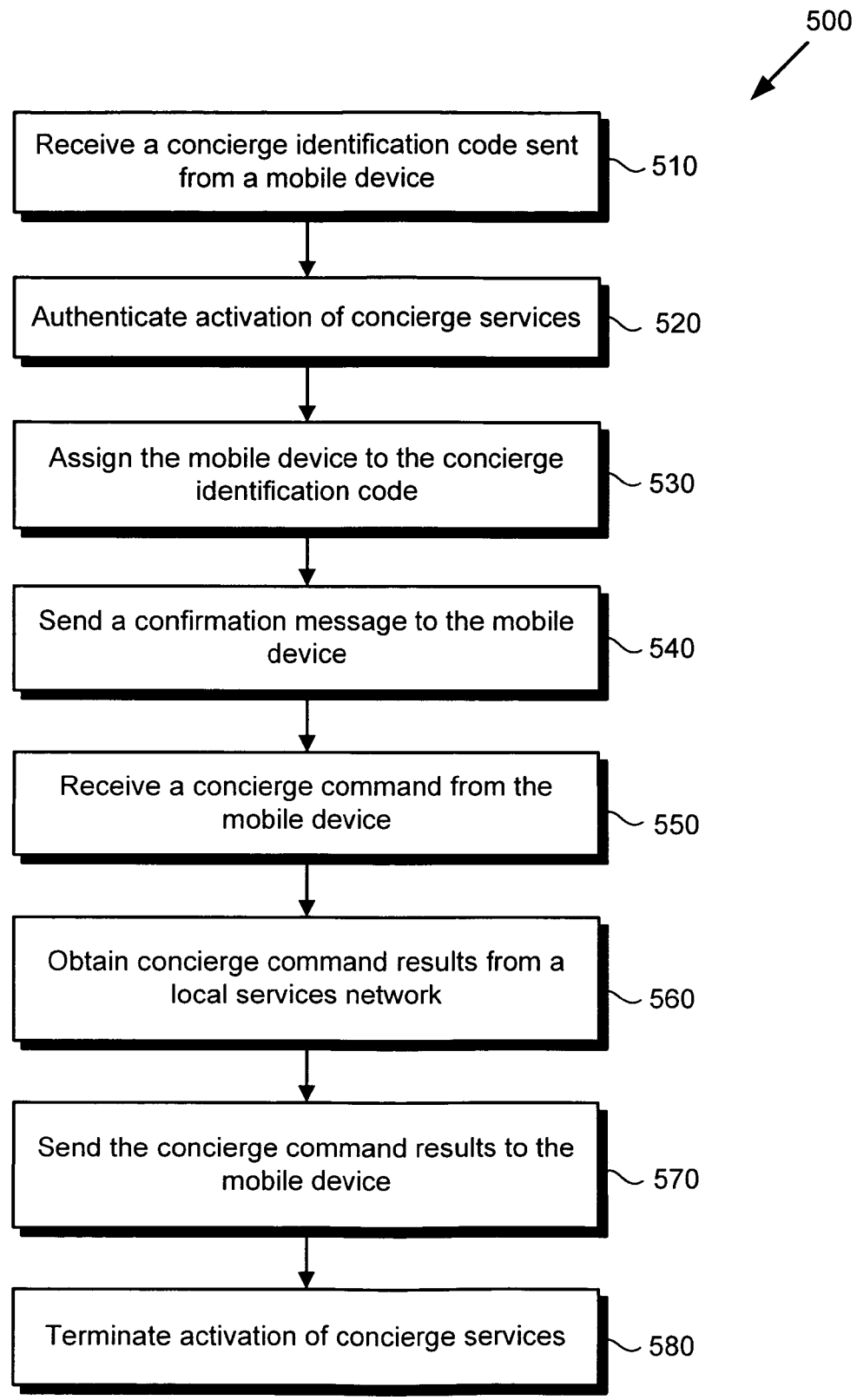

SYSTEM AND METHOD FOR PROVIDING CONCIERGE SERVICES TO A MOBILE DEVICE USER

RELATED APPLICATIONS

This application claims priority to U.S. Provisional Application No. 61/069,116, filed on Mar. 11, 2008, which is hereby incorporated by reference in its entirety.

BACKGROUND OF THE INVENTION

1. Field of the Invention

The present invention relates generally to network communications. More particularly, the present invention relates to providing network mediated services to a user of a mobile communication device.

2. Background Art

Modern recreational venues such as theme parks and destination resort properties are often large complex physical spaces hosting a wide variety of diverse attractions. These large venue configurations are enabled in part by modern communications technology, which is capable of providing support for and coordination of multiple functions over large spaces, through local area networking for example. As a result, although individual visitors to modern recreational venues are likely to be presented with more diversionary options than ever before, they may be hindered by the very attributes of venue size and variety in their ability to locate and enjoy the specific attractions they may find most desirable.

A conventional solution to providing logistical support to visitors to a large recreational venue is familiar to anyone who has visited a theme park or zoo. Visitors, upon entry to the venue, are typically provided with a printed map of the venue property and a printed list of present events. The present events listing may be updated and printed daily, for example, and may alert the visitor to temporary attraction closings and portions of the venue undergoing maintenance, as well as inform them of new attractions, the timing and location of performances, and the hours of operation of dining facilities. Together, the printed map and events listing are intended to provide the visitor with logistical support sufficient to make their visit enjoyable.

Although perhaps useful in encouraging a visitor to plan their outing, and providing basic information to assist the visitor in organizing those plans, this conventional approach to providing logistical support to a visitor may be inadequate on several grounds. A primary deficiency of the conventional approach is that the information provided by the printed materials is static when viewed by reference to the duration of a typical visit. For example, since the materials are normally updated and printed daily, while a typical venue visit may last less than a day, changes occurring during a shorter time window pertinent to the visitor experience are not reflected in the printed materials. As a result, such timely and relevant information as changing foot traffic congestion patterns throughout the venue, attraction wait times, anticipated seating delays at dining locations within the venue, and notifications of the availability of desired products or services may be unavailable to a visitor or difficult to access.

Moreover, the conventional approach to merely publishing logistical information places a substantial burden of the work of planning on the visitor, which may further compromise visitor enjoyment. After all, an outing to a recreational venue is typically a leisure activity, undertaken for the purposes of pleasurable diversion and/or relaxation. Under those circumstances, requiring a visitor to formulate a sophisticated exploration strategy and seek out information updates relevant to that strategy in order to extract value from the outing, may produce visitor frustration, and even consumer dissatisfaction, which could have undesirable consequences for the venue host.

Accordingly, there is a need to overcome the drawbacks and deficiencies in the art by providing solutions to deliver logistical planning and other value added services to visitors.

SUMMARY OF THE INVENTION

There is provided a system and method for providing concierge services to a mobile device user, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2 is a block diagram of a system for providing concierge services, according to another embodiment of the present invention;

FIG. 4 shows a table presenting example concierge commands for use by a mobile device user, according to one embodiment of the present invention; and FIG. 5 is a flowchart presenting a method for providing concierge services, according to one embodiment of the present invention.

DETAILED DESCRIPTION OF THE INVENTION

Figure 1:
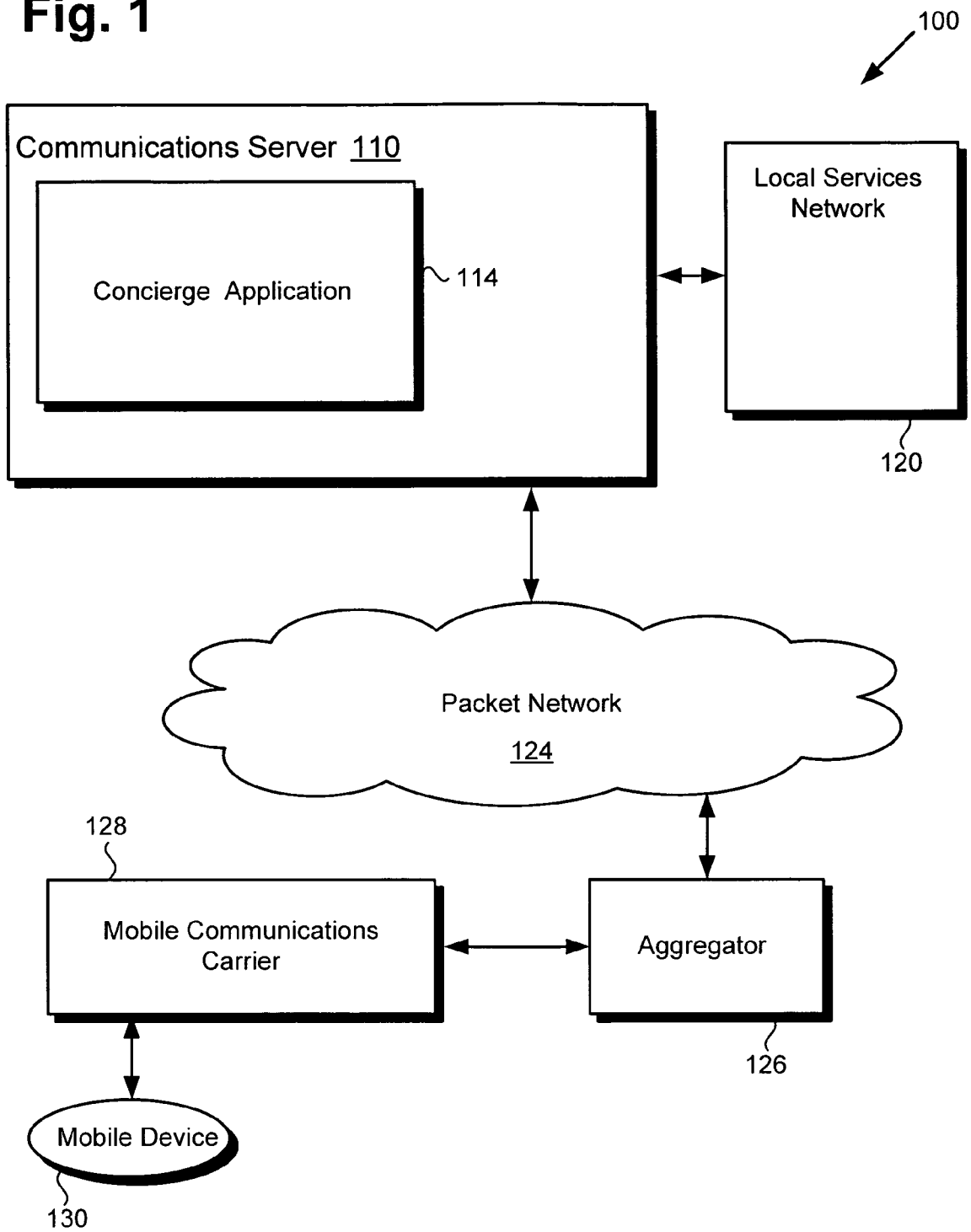
FIG. 1 is a block diagram of a system for providing concierge services, according to one embodiment of the present invention.

The present application is directed to a system and method for providing concierge services to a mobile device user. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 is a block diagram of communication system 100 for providing concierge services to a mobile device user, according to one embodiment of the present invention. Communication system 100 includes communications server 110, local services network 120, packet network 124, aggregator 126, mobile communications carrier 128, and mobile device 130. Communications server 110 may be used to support communication at a recreational venue such as a theme park or destination resort, for example. As shown in FIG. 1, communications server 110 is interactively linked to local services network 120, which may perform any of numerous information management functions within the recreational venue. For example, local services network 120 may provide updated information relevant to services and amenities available for enjoyment by visitors to the recreational venue. Also shown in FIG. 1 is concierge application 114, residing on communications server 110.

According to the embodiment of FIG. 1, concierge application 114 on communications server 110 is configured to coordinate concierge messaging between mobile device 130 and local services network 120. Mobile device 130 corresponds to a device operated by a user (not shown in FIG. 1) who is a guest visiting the recreational venue, alone or as a member of a group. For example, a guest using mobile device 130 may identify him or herself to concierge application 114 by sending a short message service (SMS) text message containing a concierge identification code to communications server 110 via mobile communications carrier 128. As shown in FIG. 1, aggregator 126, which may be a short message service center (SMSC) for example, mediates communication between mobile communications carrier 128 and communications server 110.

As a result the user of mobile device 130 can enhance their enjoyment of the resources provided by the recreational venue by accessing concierge services through concierge application 114. For example, mobile device 130 can be used to send concierge command messages reserving products or services available through the recreational venue served by communications server 110. In addition, the user of mobile device 130 can utilize concierge application 114 to obtain information from local services network 120, as well as to interact with a human concierge liaison, who may be personally assigned to assist the mobile device user for the duration of his or her visit to the recreational venue.

Although the present embodiment is described by reference to SMS text message exchange of concierge communications, in other embodiments, concierge messaging may occur via other messaging formats. For example, in one embodiment concierge messaging may include exchange of Multimedia Messaging Service (MMS) messages. In another embodiment, concierge messaging may occur through mobile Instant Messaging IM, enabled by Enhanced Data rates for Global System for Mobile communications (EDGE), Enhanced General Packet Radio Service (EGPRS), or International Mobile Telecommunications Single Carrier (IMT-SC) technologies, for example.

Turning to FIG. 2, FIG. 2 is a block diagram of communication system 200 for providing concierge services to a mobile device user, according to another embodiment of the present invention. Communication system 200 comprises communications server 210, local services network 220, and mobile device 230, corresponding respectively to communications server 110, local services network 120, and any of mobile devices 130, in FIG. 1. Also shown in FIG. 2 is concierge application 214, corresponding to concierge application 114, in FIG. 1. In addition, in FIG. 2, communications server 210 includes concierge communication control software 219a, having no analogue in FIG. 1.

As shown in FIG. 2, mobile device 230 is in communication with communications server 210 through local area network (LAN) 226, which may be supported by the recreational venue hosting communications server 210, for example. Mobile device 230 includes mobile operating system 232 located in memory 234, controller 236, mobile browser 237, and display 238. Also present in memory 234 of mobile device 230, is concierge communication control software 219b, corresponding to concierge communication control software 219a, on communications server 210. Mobile device 230 may be any device capable of supporting wireless data band communication, such as a suitably configured mobile telephone, personal digital assistant (PDA), digital media player, wireless computer, or wireless gaming console, for example.

According to the present embodiment, concierge communication control software 219b is located in memory 234, having been received from communications server 210 via LAN 226. LAN 226 may comprise a wireless network such as a Wi-Fi, Worldwide Interoperability for Microwave Access (WiMAX), or Bluetooth network, for example. Although in the present embodiment, transfer of concierge communication control software 219a is shown to result from data transfer over LAN 226, in another embodiment concierge communication control software 219a may be downloaded over a packet network, such as the Internet, for example. In yet another embodiment, concierge communication control software 219a may be transferred via a wired or wireless connection to a client computer (not shown in FIG. 2). In that embodiment, the client computer serving as the intermediary transfer mechanism for transfer of concierge communication control software 219a may itself receive concierge communication control software 219a as a download over a packet network, a transfer over LAN 226, or as an upload from a compact disc read-only memory (CD-ROM) or other portable computer-readable storage medium. Once transferred to mobile device 230, concierge communication control software 219b may be stored in memory 234 and run locally on mobile device 230.

Controller 236 may be the central processing unit for mobile device 230, for example, in which role controller 236 runs mobile operating system 232, launches mobile browser 237, and facilitates execution of concierge communication control software 219b. Web browser 237, under the control of controller 236, may be used to enable a user of mobile device 230 to view concierge messaging content distributed by concierge application 214 running on communications server 210.

As is the case for communication system 100 in FIG. 1, in FIG. 2, communications server 210 is configured to coordinate concierge messaging between mobile device 230 and local services network 220. In the implementation shown in FIG. 2, concierge communication control software 219b running on mobile device 230 enables the guest operating that device to access concierge application 214. Concierge application 214 is configured to activate concierge services for the mobile device user in response to receipt of a valid concierge identification code from mobile device 230, receive a concierge command from mobile device 230, obtain concierge command results from local services network 220, send the concierge command results to mobile device 230, and expire or terminate activation of concierge services for the user of mobile device 230 at a suitable time. As a result, mobile device 230 may be utilized by a guest to access concierge services, as well as network information assets during the activation period.

Figure 3A:
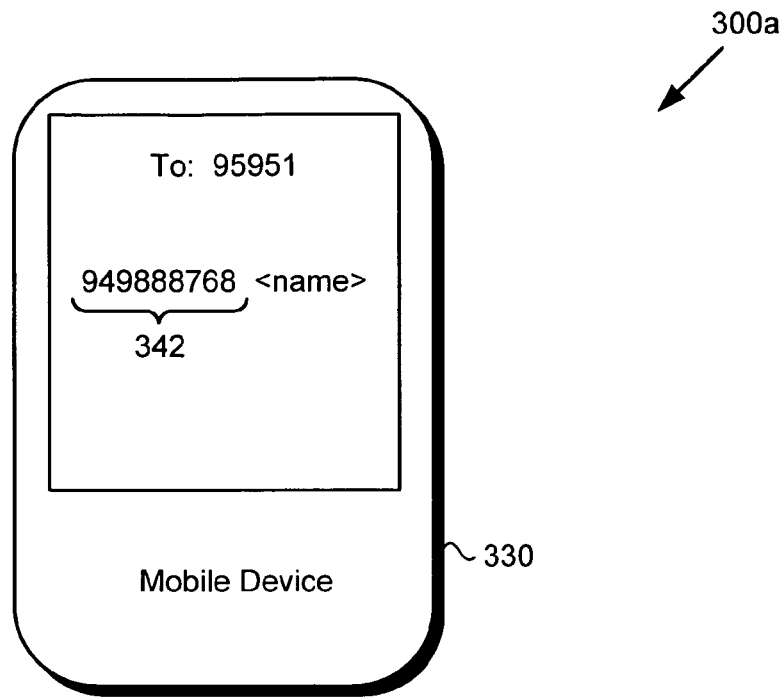
FIG. 3A shows a visual frame of a mobile device display corresponding to entry of a concierge identification code, according to one embodiment of the present invention.
Figure 3B:
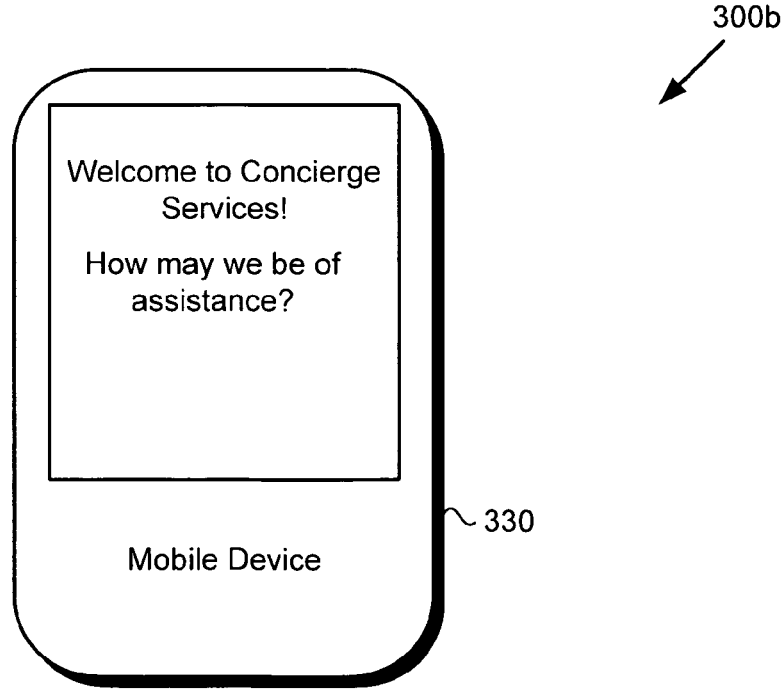
FIG. 3B shows a visual frame of a mobile device display including a confirmation message sent by a communications server running a concierge application, according to one embodiment of the present invention.
Figure 3C:
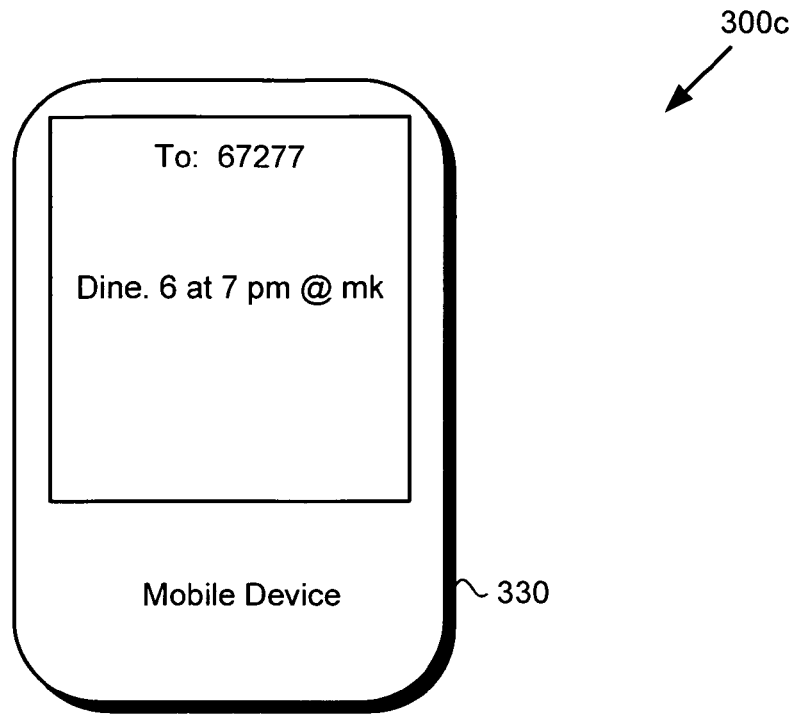
FIG. 3C shows a visual frame of a mobile device display corresponding to entry of a concierge command, according to one embodiment of the present invention.
Figure 3D:
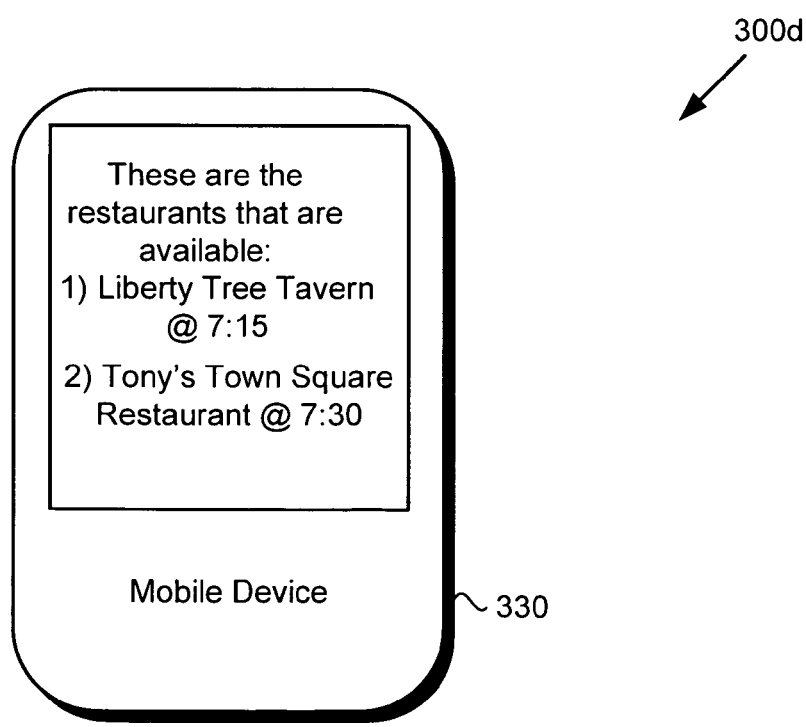
FIG. 3D shows a visual frame of a mobile device display including concierge command results sent by a communications server running a concierge application, according to one embodiment of the present invention.

As has been previously mentioned, the communication systems shown in FIGS. 1 and 2 may be utilized to access concierge services during a visit to a recreational venue. Those aspects of the present invention will now be further described by reference to FIGS. 3A, 3B, 3C, 3D, 4, and 5, in addition to FIG. 1. FIG. 3A shows visual frame 300a of a mobile device display corresponding to entry of a concierge identification code, according to one embodiment of the present invention, while FIG. 3B shows exemplary visual frame 300b of a confirmation message sent by a communications server running a concierge management application. FIG. 3C shows visual frame 300c of a mobile device display corresponding to entry of a concierge command, according to one embodiment, while FIG. 3D shows exemplary visual frame 300d of command results sent by communications server 110 running concierge application 114. FIG. 4 shows a table listing exemplary concierge commands and the operations they perform. It is noted that mobile device 330 corresponds to mobile device 130, in FIG. 1. It is further noted that although for clarity of presentation, the following description focuses on the system shown FIG. 1, the system of FIG. 2 is fully capable of providing the described concierge services.

FIG. 5 shows flowchart 500 describing the steps, according to one embodiment, of a method of providing concierge services to a mobile device user. Certain details and features have been left out of flowchart 500 that are apparent to a person of ordinary skill in the art. For example, a step may comprise one or more substeps or may involve specialized equipment or materials, as known in the art. While steps 510 through 580 indicated in flowchart 500 are sufficient to describe one embodiment of the present method, other embodiments may utilize steps different from those shown in flowchart 500, or may include more, or fewer steps.

Referring to step 510 of flowchart 500 in conjunction with FIGS. 1 and 3A, step 510 comprises receiving a concierge identification code sent from a mobile device. Step 510 may correspond, for example, to receipt at communications server 110, in FIG. 1, of a message like that shown in visual frame 300a, from mobile device 130. For illustrative purposes, let us focus on the exemplary scenario of a family visit to a destination resort associated with a theme park, such as the Magic Kingdom. For this example, let us further assume that mobile device 130 is operated by one or more members of the family on behalf of the entire group.

After an early arrival at the resort hotel, the family decides to make the most of their first afternoon by visiting the Magic Kingdom, which happens to be the recreational venue having concierge services provided by communication system 100, in FIG. 1. Upon entry into the Magic Kingdom, the family may be provided with documentation explaining the features and operation of the available concierge services. The described documentation may include a concierge identification code uniquely assigned to the user or users of mobile devices 130. The concierge identification code may take the form of a printed alphanumeric code, requiring manual entry in to mobile communication device 130, or a radio frequency identification (RFID) tag readable by mobile device 130, for example. In one embodiment, a protocol for assigning concierge identification codes assures that sequential codes are not assigned to successive users entering the park, in order to prevent one visitor or group from successfully guessing the concierge identification code assigned to another visitor or group, and causing mischief.

Having received and reviewed the documentation explaining concierge services available in the park, the family wishing to opt in to the concierge service provided through communications server 110 by concierge application 114, may do so by sending a specific text message to communications server 110. In one embodiment, shown in FIG. 3A, the opt in text message is sent to a number corresponding to concierge application 114, i.e. 95951 in FIG. 3A. The contents of the text message include concierge identification code 342 and the name in which the user of mobile communication device 330 wishes concierge coordinated arrangements to be made in the park. Receipt of such an opt in message at communications server 110 occurs at step 510 of flowchart 500.

The method of flowchart 500 continues with step 520, which comprises authenticating activation of concierge services for concierge identification code 342. Step 520 may be performed on communications server 110, for example, using concierge application 114. Where a concierge identification code received in step 510 corresponds to a first instance of receipt of that particular code, authenticating activation may comprise initiating activation of concierge services for the received code. In one embodiment, a single concierge identification code may be shared among a group possessing more than one mobile device. In that latter embodiment, where activation has already been initiated by a previously received message containing the concierge identification code from a first mobile device, authenticating activation in step 520 may comprise associating the second mobile device with concierge services provided under that particular code. In some embodiments, concierge service may be supported for a predetermined activation period. In those embodiments, step 520 may additionally correspond to verification that the activation period for concierge services has not elapsed.

Flowchart 500 continues with step 530, comprising assigning the mobile device to the concierge identification code. Having received an opt in message in step 510, and having authenticated activation of concierge services for the designated concierge identification code in step 520, concierge application 114 may assign the mobile device from which the opt in message originated, to the received concierge identification code. Step 530 may be followed by step 540, comprising sending a confirmation message to the mobile device. As shown in FIG. 3B, a confirmation message may comprise a simple welcome greeting and invitation to access concierge services.

Step 550 of flowchart 500 comprises receiving a concierge command from the mobile device. The contents of a concierge command may include command symbols or keywords to identify the message as a concierge command and, thus, distinguish it from other message types. One example of a concierge command is shown in FIG. 3C, corresponding to the user of mobile device 330 seeking information regarding in-park dining options within the Magic Kingdom for a group of six persons, at or about seven o'clock p.m. In the example of visual frame 300c, the single word sentence "Dine." comprises a keyword alerting communications server 110 that the received message is a concierge command intended for concierge application 114.

As an alternative to keywords, a command symbol, such as an exclamation mark, for example, may precede a message requesting information, thus designating the message as a concierge command. Concierge commands may include requests for information regarding the availability of products or service in-park, requests for specific park information, and requests for personal services such as assistance in arranging dinner reservations, as shown in FIGS. 3C and 3D. For example, a user of mobile device 330 may send a concierge command after specifying their current park location, to obtain information about entertainment options in their vicinity. Thus, a user visiting the Magic Kingdom (MK), Epcot, Disney's Hollywood Studios (STUDIO), or Disney's Animal Kingdom Park (AK) may obtain information and alerts relevant to those particular venues.

In one embodiment, the mobile device user may also be participating in management of group communications supported by the recreational venue, and may command that their own mobile device be placed in a quiet mode relative to group messaging. In one embodiment, a concierge command may comprise a request for present wait times at in-park attractions, or a request to receive an alert message when wait times at an attraction drop below a specified threshold. Table 450 in FIG. 4 presents a list of exemplary concierge commands and describes the operation performed by each exemplary command. Table 450 is by no means comprehensive, however, and concierge commands may be used to make requests not represented in FIG. 4. For example, a user desiring to discontinue concierge services prior to expiration of an activation session may send a concierge service termination command, causing the activation period to elapse early.

Following step 550, the received concierge command may be processed by concierge application 114 to obtain concierge command results from local service network 120, in step 560. As previously explained, local service network 120 may perform numerous information management functions within the park, including, for example, providing information concerning park amenities and supporting data flow between concierge application 114 and those park amenities. Consequently, the concierge command shown in FIG. 3C may result in concierge application 114 obtaining command results from local service network 120, in step 560.

Step 570 of flowchart 500 comprises sending the concierge command results to the mobile device. Step 570 is shown in FIG. 3D. Visual frame 300d in FIG. 3D shows an exemplary concierge command result sent from concierge application 114, in FIG. 1, in response to the concierge command shown in FIG. 3C. Visual frame 300d shows the available in-park options meeting the specified criteria. That is to say, a group of six persons desiring to dine in-park at or about seven o'clock p.m. can be accommodated either at the Liberty Tree Tavern fifteen minutes after the command time, or at Tony's Town Square Restaurant thirty minutes after the command time. A subsequent concierge command issuing from mobile device 330 may result in securing one of the dining reservation options for the group of six.

In one embodiment, a concierge command requesting personal services such as arranging for dinner reservations may result in the requestor being assigned to a human concierge agent for the duration of their in-park stay. In that embodiment, all subsequent requests for personal services may be routed to the same concierge agent, or their surrogate, further personalizing and enhancing the guest experience. In another embodiment, interaction with a concierge agent may include an opt in telephone number, providing a mobile device user with the option of engaging in text message or voice message communication with their assigned concierge agent.

Continuing with step 580 of flowchart 500, step 580 comprises expiring activation of concierge services. In one embodiment, it may be desirable to limit access to concierge services to guests in park. Consequently, concierge services activated as a result of park entrance may be limited in time to an activation period of from twelve to twenty four hours, for example, at the end of which provision of concierge services is discontinued. According to one embodiment, however, communications server 110 may interact with a hotel or other resort facility associated with the recreational venue, through local services network 120. In that embodiment, the duration of concierge services may correspond to the length of the stay by mobile device user at the associated hotel, for example, increasing the activation period by one or more days. Moreover, in that embodiment, concierge services may include notification, through concierge application 114, of room status or of special amenities available to the guest. As previously mentioned, in some embodiment, the menu of available concierge commands may include a service termination request, allowing the user to discontinue concierge services at will, prior to the system imposed expiration of the activation period.

Thus, the system and method for providing concierge services disclosed in the present application utilizes advances in network and personal communication technologies to empower visitors to a recreational venue. By enabling a visitor to a recreational venue to opt in to participation in concierge services, the present disclosure describes an approach that advantageously facilitates delivery of personally relevant venue information to the visitor. Furthermore, by providing a concierge application to coordinate concierge messaging between the visitor and a local services network, the present application discloses an approach that optimizes visitor access to desirable in-venue products and services.

From the above description it is manifest that various techniques can be used for implementing the present concepts without departing from their scope. Moreover, while the present application has provided a disclosure with specific reference to certain embodiments, a person of ordinary skills in the art would recognize that changes can be made in form and detail without departing from the spirit and the scope of the inventive concepts described. As such, the present embodiments are to be considered in all respects as illustrative and not restrictive. It should also be understood that other embodiments are not limited to the particular implementational details described herein, but are capable of many rearrangements, modifications, and substitutions without departing from the disclosed inventive concepts.

What is claimed is:

1. A system for providing concierge services to a mobile device user, the system comprising:
   a communications server accessible by a mobile device of the mobile device user;
   a local services network connected to the communications server;
   a concierge application resident on the communications server, the concierge application configured to:
      receive a concierge identification code from the mobile device, wherein the concierge identification code is provided to the mobile device user for use as a guest of a recreational venue to obtain the concierge services using the mobile device;
      assign the mobile device to the concierge identification code in response to receiving the concierge identification code from the mobile device;
      activate the concierge services for the mobile device user in response to receiving the concierge identification code from the mobile device;
      assign one or more other mobile devices to the concierge identification code forming a group including the mobile device and the one or more other mobile devices;

receive a concierge command from the mobile device, after activating the concierge services, requesting to be placed in a quiet mode relative to messages for the group;

obtain a message for the group; and send the message to the group except the mobile device, in response to the requesting to be placed in the quiet mode relative to messaging for the group.

2. The system of claim 1, wherein the concierge services provided by the system includes assignment of a human concierge agent to coordinate the delivery of concierge services to the mobile device user.

3. The system of claim 1, wherein the system is configured to support concierge messaging via short message service (SMS) text messaging.

4. The system of claim 1, wherein the system is configured to support concierge messaging via email.

5. The system of claim 1, wherein the system is configured to support concierge messaging via Multimedia Messaging Service (MMS) messaging.

6. The system of claim 1, wherein the system is configured to support concierge messaging via Instant Messaging (IM).

7. The system of claim 1 further comprising:

a concierge communication control software capable of being downloaded to the mobile device; the concierge communication control software configured to enable concierge messaging among the communications server, the local services network, and the mobile device over a local area network (LAN).

8. The system of claim 7, wherein the concierge application is further configured to:

receive a concierge command from the mobile device, after activating the concierge services, requesting a wait time for an attraction within the recreational venue;

obtain the wait time for the attraction within the recreational venue in response to the concierge command from the local services network;

send the wait time for the attraction within the recreational venue in response to the concierge command to the mobile device; and alert the mobile device when the wait time for the attraction within the recreational venue drops below a specified threshold.

9. The system of claim 7, wherein the LAN comprises a Worldwide Interoperability for Microwave Access (WiMAX) network or a Wi-Fi network.

10. The system of claim 7, wherein the LAN comprises a Bluetooth network.

11. The system of claim 1, the venue corresponds to the local services network.

12. The system of claim 1, wherein the venue is a theme park or a destination resort.

13. The system of claim 1, wherein the concierge identification code has a corresponding activation period, and wherein the concierge application is further configured to terminate the activating of the concierge services for the mobile device user using the concierge identification code upon an expiration of the activation period corresponding to the concierge identification code.

14. A method for providing concierge services to a mobile device user, the method comprising:

receiving a concierge identification code sent from a mobile device of the mobile device user, wherein the concierge identification code is provided to the mobile device user for use as a guest of a recreational venue to obtain the concierge services using the mobile device;

assigning the mobile device to the concierge identification code in response to the receiving of the concierge identification code from the mobile device;

activating the concierge services for the mobile device user in response to the receiving of the concierge identification code from the mobile device;

assigning one or more other mobile devices to the concierge identification code forming a group including the mobile device and the one or more other mobile devices;

receiving a concierge command from the mobile device, after activating of the concierge services, requesting to be placed in a quiet mode relative to messages for the group;

obtaining a message for the group; and sending the message to the group except the mobile device, in response to the requesting to be placed in the quiet mode relative to messaging for the group.

15. The method of claim 14 further comprising: assigning a human concierge agent to coordinate the delivery of concierge services to the mobile device user.

16. The method of claim 14, wherein communications received from the mobile device user comprise short message service (SMS) text messages.

17. The method of claim 14, wherein communications received from the mobile device user comprise email messages.

18. The method of claim 14, wherein communications received from the mobile device user comprise Multimedia Messaging Service (MMS) messages.

19. The method of claim 14, wherein communications received from the mobile device user comprise Instant Messaging (IM) messages.

20. The method of claim 14 further comprising: providing a concierge communication control software capable of being downloaded to the mobile device, the group communication control software configured to enable concierge messaging among a communications server, a local services network, and the mobile device over a local area network (LAN).

21. The method of claim 20, wherein the LAN is one of a Wi-Fi network, a Worldwide Interoperability for Microwave Access (WiMAX) network, and a Bluetooth network.

22. The method of claim 14 further comprises:

receiving a concierge command from the mobile device, after activating the concierge services, requesting a wait time for an attraction within the recreational venue;

obtaining the wait time for the attraction within the recreational venue in response to the concierge command from the local services network;

sending the wait time for the attraction within the recreational venue in response to the concierge command to the mobile device; and alerting the mobile device when the wait time for the attraction within the recreational venue drops below a specified threshold.

23. The method of claim 14, wherein the venue is a theme park or a destination resort.

24. The method of claim 14, wherein the concierge identification code has a corresponding activation period, and wherein the method further comprises:

terminating the activating of the concierge services for the mobile device user using the concierge identification code upon an expiration of the activation period corresponding to the concierge identification code.

* * * * *